US008312018B2

(12) United States Patent
Shami et al.

(10) Patent No.: US 8,312,018 B2
(45) Date of Patent: Nov. 13, 2012

(54) ENTITY EXPANSION AND GROUPING

(75) Inventors: Mohammed Shami, Sunnyvale, CA (US); Tri Do, San Jose, CA (US); Kevin Wright, San Jose, CA (US); Hemant Puranik, San Ramon, CA (US); George Chitouras, Menlo Park, CA (US)

(73) Assignee: Business Objects Software Limited, Dublin (IE)

( * ) Notice: Subject to any disclaimer, the term of this patent is extended or adjusted under 35 U.S.C. 154(b) by 12 days.

(21) Appl. No.: 12/908,781

(22) Filed: Oct. 20, 2010

(65) Prior Publication Data

US 2012/0102031 A1  Apr. 26, 2012

(51) Int. Cl.
*G06F 7/00* (2006.01)
*G06F 17/30* (2006.01)

(52) U.S. Cl. .................................................... 707/737
(58) Field of Classification Search .................. 707/737
See application file for complete search history.

(56) References Cited

U.S. PATENT DOCUMENTS

| 6,438,543 | B1 * | 8/2002 | Kazi et al. ........................... 1/1 |
| 2005/0108630 | A1 * | 5/2005 | Wasson et al. ................. 715/513 |
| 2006/0112110 | A1 * | 5/2006 | Maymir-Ducharme et al. ............................ 707/100 |

OTHER PUBLICATIONS

Clark, et al. "Coreference resolution : current trends and future directions." (Nov. 24, 2008). http://www.cs.cmu.edu/~jhclark/pubs/clark_gonzalez_coreference.pdf (downloaded Oct. 20, 2010).
Cucerzan, "Large-scale named entity disambiguation based on Wikipedia data." Proc. 2007 Joint Conf. on Empirical Methods in Nat. Lang. Proc. & Comp. Nat Lang. Learning (pp. 708-716) (Jun. 2007).
Ravin, et al., "Extracting Names from Natural-Language Text", IBM Research Division, Retreived from the Internet: <URL:http://www.reserach.ibm.com/talent/documents/20338.pdf>, retrieved on Apr. 11, 2006, 36 pp.
Magdy et al., "Arabic Cross-Document Person Name Normalization", Proceedings of the 5th Workshop on Important Unresolved Matters, pp. 25-32, Jun. 2007.
Jain, et al. "Data Clustering: A Review", ACM Computing Surveys, vol. 31, No. 3, Sep. 1999, 60 pp.
European Search Report dated Feb. 16, 2012, for corresponding European Patent Application No. 11007491.1, 8 pp.

* cited by examiner

*Primary Examiner* — Charles Lu
(74) *Attorney, Agent, or Firm* — Mintz, Levin, Cohn, Ferris, Glovsky and Popeo, P.C.

(57) ABSTRACT

A computer readable storage medium includes executable instructions to convert an entity to a standard form including normalized attributes, a tag reference and a feature. The entity is expanded with corresponding variants. The standard form and corresponding variants are combined to form an annotated entity in a first processing step. The entity is assigned to a group in a second processing step that accesses the annotated entity. The entity is processed in a single pass comprising the first processing step and the second processing step.

20 Claims, 5 Drawing Sheets (1) PERSON: Laura S. Jones
(2) ANNOTATION: PERSON: (FirstName)LAURA (MiddleInital)S (LastName)JONES #GENDER=Female
(3) VARIANT:PERSON(FirstInitial)L (MiddleInitial)S (LastInitial)J #GENDER=Female
(4) VARIANT:PERSON(FirstInitial)L (MiddleInitial)S (LastName)JONES #GENDER=Female
(5) VARIANT:PERSON(FirstInitial)L (LastInitial)J #GENDER=Female
(6) VARIANT:PERSON(FirstInitial)L (LastName)JONES #GENDER=Female
(7) VARIANT:PERSON(FirstName)LAURA (MiddleInitial)S (LastInitial)J #GENDER=Female
(8) VARIANT:PERSON(FirstName)LAURA (LastInitial)J #GENDER=Female
(9) VAIRANT:PERSON(FirstName)LAURA (LastName)JONES #GENDER=Female
(10) VARIANT:PERSON:(FirstOrLastName)LAURA #GENDER=Female
(11) VARIANT:PERSON(FirstOrLastName)JONES #GENDER=Female

FIG. 3

(1) AliasGroup #38
(2) ANNOTATION: PERSON: (FirstName)LAURA (MiddleInital)S (LastName)JONES
GENDER=Female
(3) #1: Laura S. Jones (PERSON)
(4) #2: L Jones (PERSON)
(5) #3: Laura J (PERSON)
(6) #4: L. J. (MISC)

FIG. 5

ENTITY EXPANSION AND GROUPING

FIELD OF THE INVENTION

This invention relates generally to data processing. More particularly, this invention relates to the modular processing of entities to form expanded and grouped entities.

BACKGROUND OF THE INVENTION

There are commercially available products to analyze entities. For example, SAP Americas™ offers a product known as ThingFinder™. ThingFinder™ processes a stream of data to identify entities and potential relationships between them. In this context, an entity (or entity mention) is an object (e.g., a word or group of related words) in a data set or ordered data set. The data set may comprise a set of files, internet chat communications, email strings and the like. The entities are analyzed to derive information, such as a data summary, customer sentiment, customer preferences, and related forms of Business Intelligence.

Entity analysis is computationally expensive. Some of the computational expense is attributable to the need for multiple processing passes over an entity to ascertain entity relationships. More particularly, with existing techniques, rule based processing results in multiple processing passes of an entity before it can be assigned to a group of related entities.

It would be desirable to provide improved techniques for analyzing entities. In particular, it would be desirable to provide improved entity processing performance with reduced computational load.

SUMMARY OF THE INVENTION

A computer readable storage medium includes executable instructions to convert an entity to a standard form including normalized attributes, a tag reference and a feature. The entity is expanded with corresponding variants. The standard form and corresponding variants are combined to form an annotated entity. The entity is also assigned to a group such that all entities are processed in a single pass.

BRIEF DESCRIPTION OF THE FIGURES

The invention is more fully appreciated in connection with the following detailed description taken in conjunction with the accompanying drawings, in which:

FIG. 3 illustrates an annotated entity formed in accordance with an embodiment of the invention.

FIG. 5 illustrates an entity group formed in accordance with an embodiment of the invention.

Like reference numerals refer to corresponding parts throughout the several views of the drawings.

DETAILED DESCRIPTION OF THE INVENTION

Figure 1:
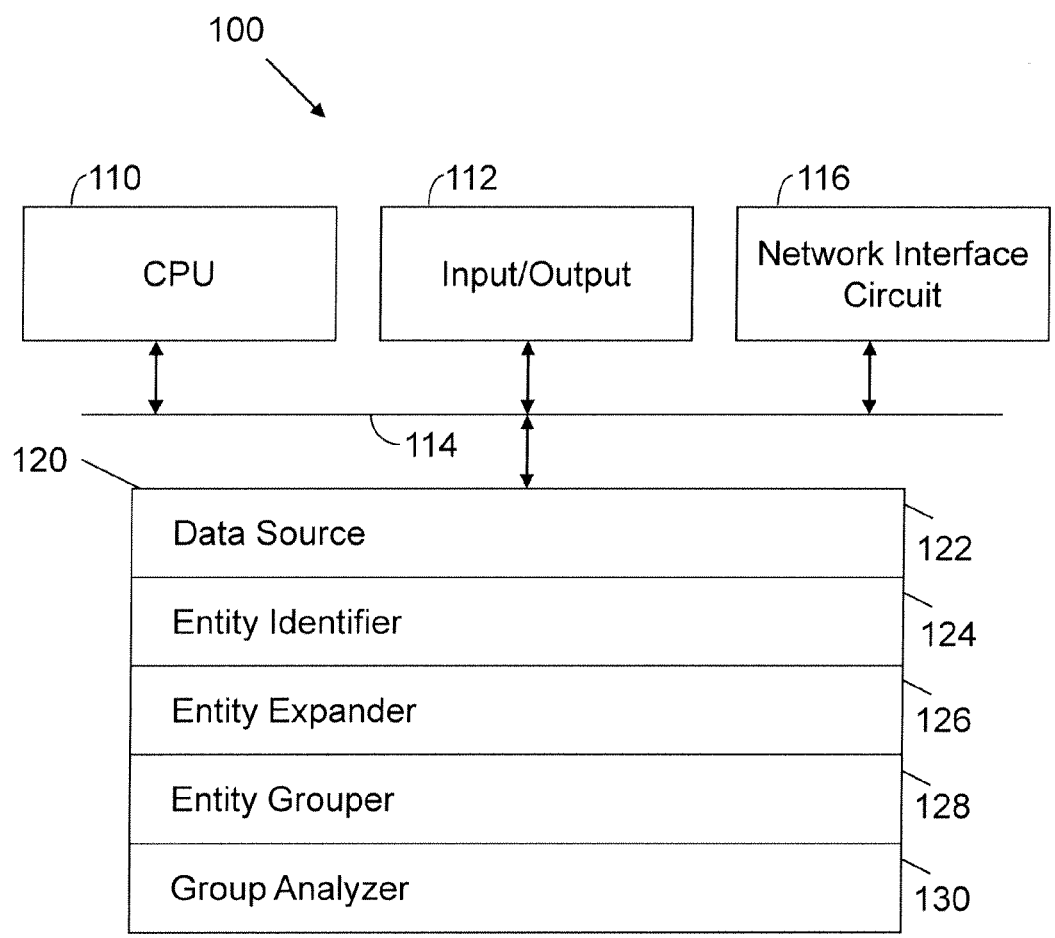
FIG. 1 illustrates a computer configured in accordance with an embodiment of the invention.

FIG. 1 illustrates a computer 100 configured to implement operations of the invention. The computer 100 includes standard components, such as a central processing unit 110 and input/output devices 112 connected via a bus 114. The input/output devices 112 may include a keyboard, mouse, display, sound processor, graphics processor and the like. A network interface circuit 116 is also attached to the bus 114, allowing the computer 110 to operate in a networked environment.

A memory 120 is also connected to the bus 114. The memory 120 may include a data source 122 that operates to supply a set of entities for processing. An entity identifier 124 includes executable instructions to identify individual entities in a set of entities. Prior art techniques may be used to identify entities.

An entity expander 126 includes executable instructions to implement operations of the invention. In one embodiment, the entity expander 126 converts an entity to a standard form, which includes normalized attributes, a tag reference and a feature, as discussed below. The entity expander 126 also expands an entity to include corresponding logical variants of the entity. The standard form of the entity and the corresponding variants are combined to form an annotated entity.

The memory 120 also stores an entity grouper 128 configured in accordance with an embodiment of the invention. The entity grouper 128 includes executable instructions to assign an annotated entity to a group. The entity grouper processes each annotated entity formed by the entity expander only once and thus accomplishes the task of grouping all entities within the ordered data set in one pass. This stands in contrast to prior art approaches in which an entity is processed several times before assigning it to a group.

In one embodiment, the entity grouper 128 is implemented with a set of state machines to improve computational efficiency. For example, entities may be converted to regular expressions that are compiled into finite state networks processed by finite state transducers. Thus, the executable instructions associated with the entity grouper 128 may be individually developed and tested. Similarly, the executable instructions of the entity expander 126 may be individually developed and tested. This also allows for modular software development.

The memory 120 also stores a group analyzer 130. The group analyzer 130 includes executable instructions to implement known techniques for analyzing groups of information. This group analysis may be used to derive various Business Intelligence metrics.

Figure 2:
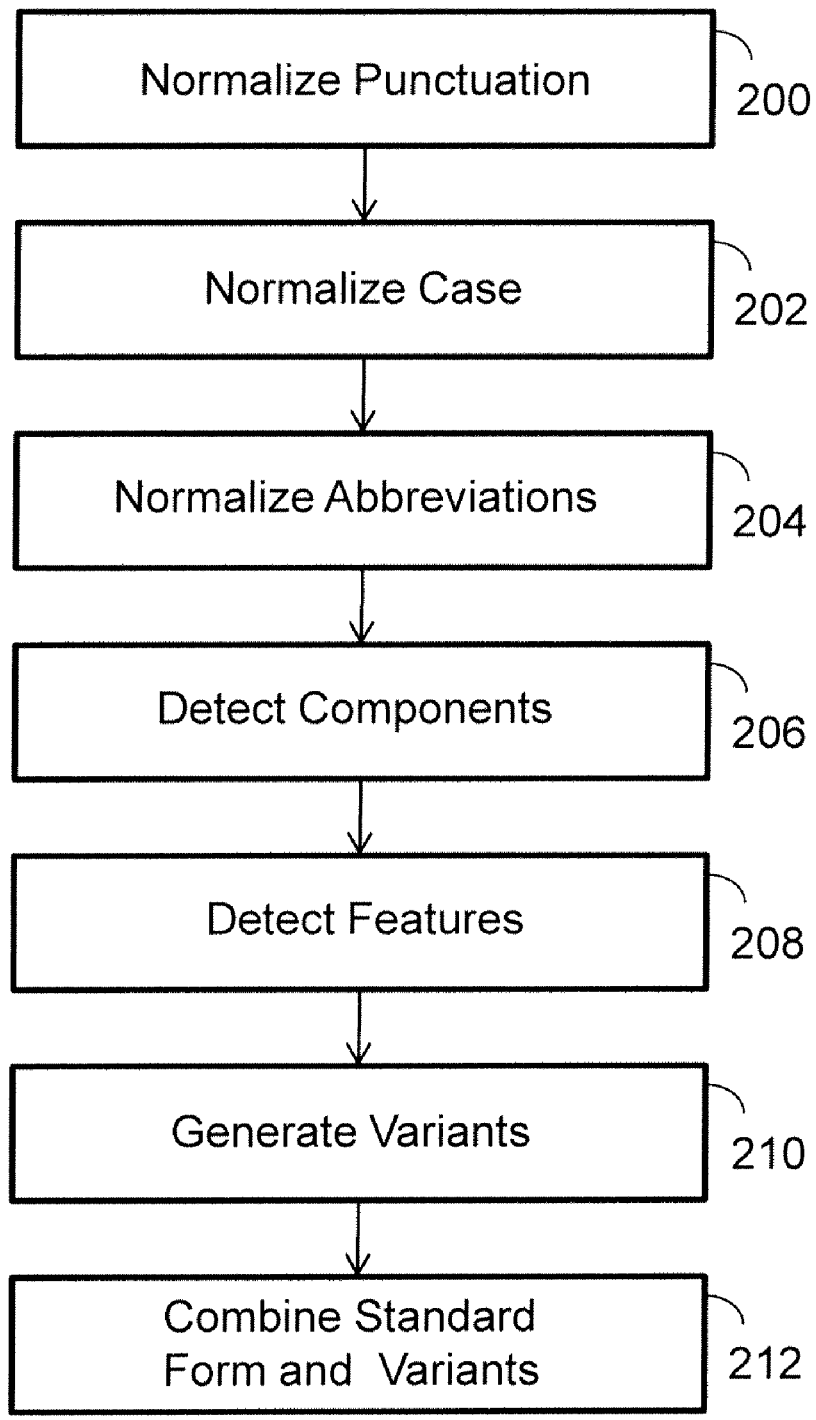
FIG. 2 illustrates processing operations associated with an entity expander utilized in accordance with an embodiment of the invention.

FIG. 2 illustrates processing operations associated with an embodiment of the entity expander 126. In one embodiment, the entity expander 126 includes executable instructions to perform normalization operations. One form of normalization is to normalize punctuation 200. For example, the period associated with a middle name, such as Laura S. Jones, may be omitted as a form of normalized punctuation.

Normalization may also entail normalizing case 202. For example, all letters associated with an object may be normalized to be expressed as capital letters. Thus, an original object such as Laura S. Jones would be normalized to LAURA S JONES. Another normalization operation may be to normalize abbreviations 204. For example, Mister may be normalized to "Mr." or California may be normalized to "CA".

Another processing operation associated with the entity expander 126 is to detect components 206. In this operation, individual components of an object are isolated and tagged. The components detected will depend on the type of object. For example, in the case of a name Laura S. Jones, the components may be annotated as three components: a first name (Laura), a middle initial (S) and a last name (Jones). The normalization may include tag references for each component. In this example, tag references of (FirstName), (MiddleInitial) and (LastName) are used. In the case of an address 123 First Street, San Jose, Calif., the components may be annotated as: a street (123 First Street), a city (San Jose), and a state (Calif.). Tag references for this example would be (Street), (City), (State).

The entity expander 126 may also include executable instructions to detect a feature of an object 208. A feature characterizes an attribute of an entity. For example, in the case of Laura S. Jones, the entity expander 126 includes executable instructions to deduce that this object has a feature of being a person. In addition, it may conclude that the object has a gender feature of female.

Features limit the scope of an annotated entity or an entity group and considerably increase matching performance by quick elimination. For example, Washington with feature CITY cannot match Washington with feature PERSON, but Washington without any feature can.

The next processing operation of FIG. 2 is to generate variants of the object 210. The variants represent alternate forms of the same object. For example, the alternate forms may include abbreviations or partial components of the object, examples of which are provided below. Thus, the operation to generate variants of the object 210 may be a sequence of operations, which is shown as a single operation for simplicity.

The final processing operation of FIG. 2 is to combine the standard or normalized form of the object with object variants 212. This results in an annotated entity. This annotated entity will then be processed by the entity grouper to assign it to a group. Thus, each entity is processed in two consecutive steps: To form the annotated entity and then to assign it to a group. These consecutive steps are performed in a single pass over an entity.

FIG. 3 illustrates an example of an annotated entity formed in accordance with an embodiment of the invention. The first line of the annotated entity specifies a feature of PERSON, which is associated with the object Laura S. Jones. This object is in its originally observed form in a data set. The next line of the annotated entity is an annotation in standard or normalized form. In this example, the normalized form uses all capitals and omits the period associated with "S.". The normalized form includes tag delimited components, including (FirstName) LAURA, (MiddleInitial) S, and (LastName) JONES. This normalized form also specifies a feature of "#GENDER=Female".

The remaining lines of FIG. 3 illustrate variants of the normalized object. In the third line, the variant specifies a person with a tag of (FirstInitial) L, a tag for (MiddleInitial) S, a tag for (LastInitial) J and a feature of "#GENDER=Female". The fourth line is similar to the third line, but specifies a variation with a tag for (LastName) JONES. The remaining lines in the figure provide alternate variations. Additional variants may be utilized in accordance with embodiments of the invention.

Figure 4:
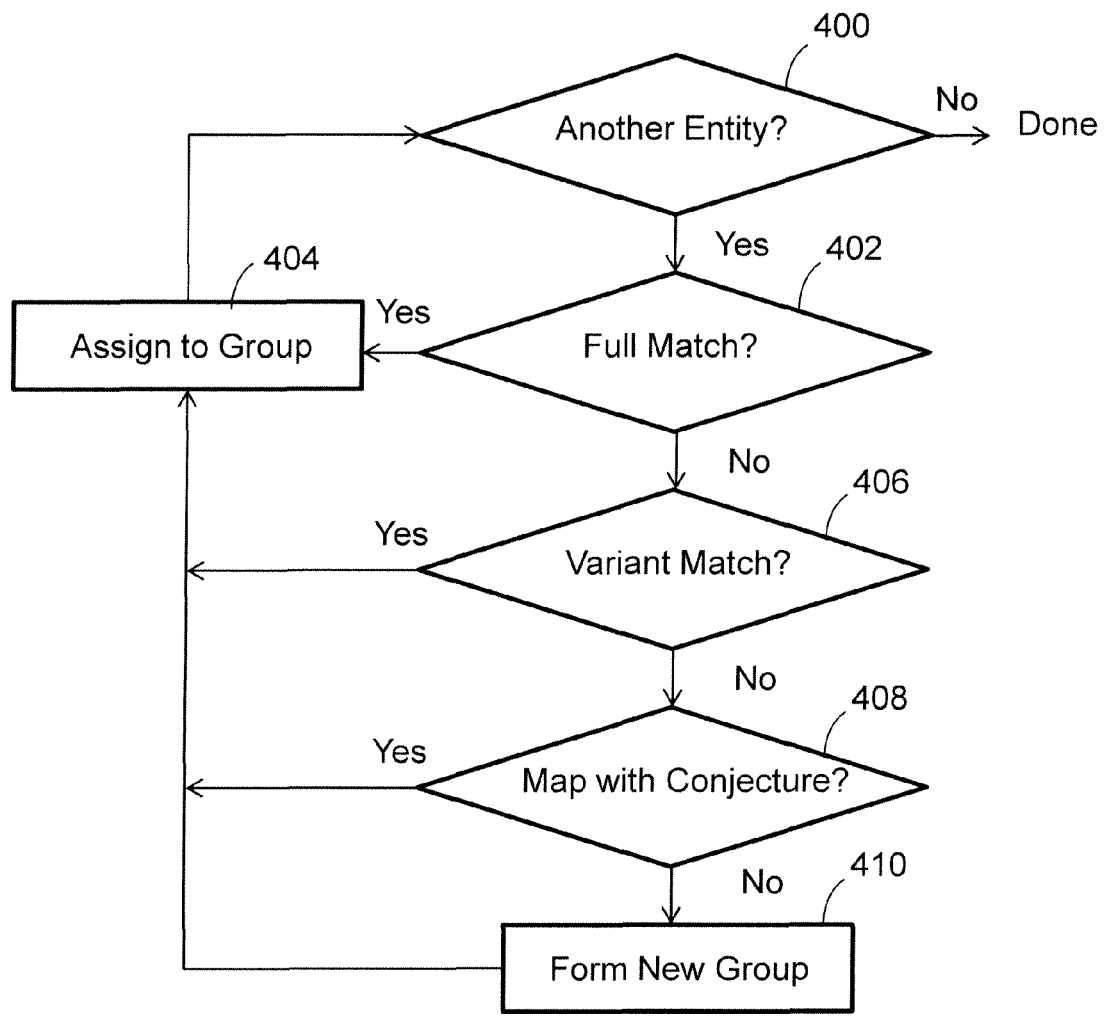
FIG. 4 illustrates processing operations associated with an entity grouper utilized in accordance with an embodiment of the invention.

Thus, at this point, the entity expander 126 has formed an annotated entity expressing a standard form and corresponding variants. When the same object is encountered later in the same data set, either in its standard form or a variant form, then it can be matched to an annotated entity. In this way, various non-uniform references to an object can be equated to the same object. Each annotated entity is processed by the entity grouper to assign it to a group. The grouping operations are implemented with the entity grouper 128. FIG. 4 illustrates processing operations associated with an embodiment of the entity grouper 128.

The first operation of FIG. 4 is to assess whether another entity is present 400. If so, the observed object is compared to annotated entities to determine if there is a full (standard form) match 402. If so, the object is assigned to a group 404. The group 404 is a list of related objects. If a full match does not exist, the entity grouper 128 determines if there is a variant match (variant form match). That is, if there is not a direct correspondence between the processed entity and the standard form of an object, the system determines if one of the variants of the annotated entity matches the processed entity. If there is a variant match, then the processed entity is assigned to the appropriate group 404.

If a variant match does not exist, then the system decides whether to map the processed entity with a conjecture 408. If so, the processed entity is assigned to a group 404. In this case, the processed entity's status in the group may be marked with some type of notation indicating a conjectured participation in the group. This approach is helpful when logic suggests group participation, even though a full match or variant match does not exist. Different criteria may be used to support a conjecture. For example, proximity between an object and a similar object may form the basis for conjectured group participation. This approach supports single pass assignment of an object to a group.

If the entity fails the tests of blocks 402, 406 and 408, then a new group is formed 410 for the unidentified object. This processing is repeated until all objects of the data set have been processed. Preferably, the objects are supplied in read order so that read order can be considered in grouping operations.

FIG. 5 illustrates an example a group formed by the entity grouper 128. The first line of the group specifies a group number: "AliasGroup #38". The second line lists the standardized form of the object, which is the same form shown in line 2 of FIG. 3. The third line lists the form of the observed object and also specifies a feature of PERSON. The fourth line lists a variant form of the entity. Observe that this variant corresponds to the variant listed at line 6 of FIG. 3. The fifth line lists a variant form of another entity. This variant corresponds to the variant listed at line 8 of FIG. 3. The final entry of the group of FIG. 5 provides the object form "L.J.". The expressed feature in this case is miscellaneous or (MISC). This nomenclature expresses a conjecture corresponding to operation 408 of FIG. 4. Observe that "LS" includes components of variant entries of lines 3, 4, 5, 6, and 7, which forms the basis of the conjecture. This ability to conjecture at the time of processing an entity supports the single pass nature of the entity grouping, which enhances the computational efficiency of the system.

The group of FIG. 5 and other derived groups may now be processed by the group analyzer 130 to provide specified Business Intelligence. Prior art group analysis techniques may be used at this point.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   receive a set of entities;
   process each of the entities in a single pass of the set of entities, the processing for each entity comprising:
      converting the entity to a standard form including normalized attributes, a tag reference and a feature;
      expanding the entity with corresponding variants;
      forming an annotated entity combining the standard form and the corresponding variants; and
      assigning, using an entity grouper, the entity to (i) an existing group generated when processing a previous entity that matches the annotated entity and (ii) a new group if the annotated entity does not match an existing group;
   wherein:
      the entity grouper is implemented with a set of state machines and, at least a portion of the entities are converted into regular expressions that are compiled into finite state networks processed by finite state transducers,
      each annotated entity comprises:
         a feature of the corresponding entity in an originally observed form in a corresponding data set,
         an annotation of the entity in a normalized form having tag delimited components, and
         at least one variant of the normalized form having tag delimited components.

2. The computer readable storage medium of claim 1 wherein the normalized attributes include normalized punctuation, normalized case and normalized abbreviations.

3. The computer readable storage medium of claim 1 wherein the tag reference characterizes the entity.

4. The computer readable storage medium of claim 1 wherein the feature characterizes an attribute of the entity.

5. The computer readable storage medium of claim 1 wherein the corresponding variants characterize presumed equivalent entities.

6. The computer readable storage medium of claim 1 wherein the group specifies the standard form for a first instance.

7. The computer readable storage medium of claim 6 wherein the group specifies a second instance.

8. The computer readable storage medium of claim 7 wherein the group specifies a third instance with a conjectured inclusion in the group.

9. The computer readable storage medium of claim 1 wherein matching used in connection with the assigning is based upon a standard form match.

10. The computer readable storage medium of claim 1 wherein matching used in connection with the assigning is based upon a variant form match.

11. The computer readable storage medium of claim 1 wherein matching used in connection with the assigning is based upon a conjectured match, the conjectured match being based on a proximity between the annotated entity and the matching group when a full standard form match or a variant form match does not exist.

12. The computer readable storage medium of claim 1 further comprising executable instructions to form a plurality of groups.

13. The computer readable storage medium of claim 12 further comprising executable instructions to analyze relationships between the plurality of groups.

14. A method for implementation by one or more data processors comprising:
   receiving, by at least one data processor, a set of entities;
   processing, by at least one data processor, each of the entities in a single pass of the set of entities, the processing for each entity comprising:
      converting the entity to a standard form including normalized attributes, a tag reference and a feature;
      expanding the entity with corresponding variants;
      forming an annotated entity combining the standard form and the corresponding variants; and
      assigning, using an entity grouper, the entity to (i) an existing group generated when processing a previous entity that matches the annotated entity and (ii) a new group if the annotated entity does not match an existing group;
   wherein:
      the entity grouper is implemented with a set of state machines and, at least a portion of the entities are converted into regular expressions that are compiled into finite state networks processed by finite state transducers,
      each annotated entity comprises:
         a feature of the corresponding entity in an originally observed form in a corresponding data set,
         an annotation of the entity in a normalized form having tag delimited components, and
         at least one variant of the normalized form having tag delimited components.

15. A system comprising:
   one or more data processors; and
   memory storing instructions which, when executed, result in operations comprising:
      receiving, by at least one data processor, a set of entities from at least one data set;
      processing, by at least one data processor, each of the entities in a single pass of the set of entities, the processing for each entity comprising:
         converting the entity to a standard form including normalized attributes, a tag reference and a feature;
         expanding the entity with corresponding variants;
         forming an annotated entity combining the standard form and the corresponding variants; and assigning, using an entity grouper, the entity to (i) an existing group generated when processing a previous entity that matches the annotated entity and (ii) a new group if the annotated entity does not match an existing group;

wherein:

the entity grouper is implemented with a set of state machines and, at least a portion of the entities are converted into regular expressions that are compiled into finite state networks processed by finite state transducers, each annotated entity comprises:

a feature of the corresponding entity in an originally observed form in the corresponding data set, an annotation of the entity in a normalized form having tag delimited components, and at least one variant of the normalized form having tag delimited components.

16. The system of claim 15 wherein matching used in connection with the assigning is based upon a variant form match.

17. The system of claim 15 wherein matching used in connection with the assigning is based upon a conjectured match, the conjectured match being based on a proximity between the annotated entity and the matching group when a full standard form match or a variant form match does not exist.

18. The method of claim 14 wherein matching used in connection with the assigning is based upon a standard form match.

19. The method of claim 14 wherein matching used in connection with the assigning is based upon a variant form match.

20. The method of claim 14 wherein matching used in connection with the assigning is based upon a conjectured match, the conjectured match being based on a proximity between the annotated entity and the matching group when a full standard form match or a variant form match does not exist.

* * * * *